(12) United States Patent
Hilakos et al.

(10) Patent No.: US 11,560,310 B1
(45) Date of Patent: Jan. 24, 2023

(54) METHOD FOR PRODUCING A CALCIUM PHOSPHATE SALT

(71) Applicant: JESA TECHNOLOGIES LLC, Lakeland, FL (US)

(72) Inventors: Stephen Wayne Hilakos, Lakeland, FL (US); Anis Lakhouaja, Lakeland, FL (US)

(73) Assignee: JESA TECHNOLOGIES LLC, Lakeland, FL (US)

( * ) Notice: Subject to any disclaimer, the term of this patent is extended or adjusted under 35 U.S.C. 154(b) by 0 days.

(21) Appl. No.: 17/670,364

(22) Filed: Feb. 11, 2022

(51) Int. Cl.
 *C01B 25/32* (2006.01)

(52) U.S. Cl.
 CPC ........ *C01B 25/321* (2013.01); *C01P 2006/80* (2013.01)

(58) Field of Classification Search
 CPC .............................. C01B 25/321; C01B 25/32
 See application file for complete search history.

(56) References Cited

U.S. PATENT DOCUMENTS

| | | |
|---|---|---|
| 3,425,837 A | 2/1969 | Conte et al. |
| 3,829,562 A | 8/1974 | Kim et al. |
| 3,935,298 A * | 1/1976 | Sugahara ............... C01B 25/232 423/157.4 |
| 5,180,569 A | 1/1993 | Erickson et al. |
| 5,427,757 A | 6/1995 | Erickson et al. |
| 5,531,975 A | 7/1996 | Erickson et al. |
| 7,560,031 B1 | 7/2009 | Astley et al. |
| 10,464,853 B2 | 11/2019 | Takhim |

FOREIGN PATENT DOCUMENTS

WO 01/89990 A1 11/2001

OTHER PUBLICATIONS

Albustami et al., "FSA Neutralization with Calcium Compounds," *Arab Fertilizer Association*: 1-9, Nov. 22-24, 2011, (11 pages).
Fernandes et al., "Relative Bioavailability of Phosphorus in Feed and Agricultural Phosphates for Poultry," *Poultry Science* 78: 1729-1736, Jul. 26, 1999,.
Freitas et al., "Production of defluorinated dicalcium phosphate from phosphate rock concentrate," *Nutrient Cycling in Agroecosystems* 48:235-236, 1997, (4 pages), (w/ abstract).
Li et al., "Phosphorus Bioavailability: A Key Aspect for Conserving this Critical Animal Feed Resource with Reference to Broiler Nutrition," *Agriculture* 6(25): 1-15, 2016.
Lima et al., "Chemical and Physical Evaluations of Commercial Dicalcium Phosphates as Sources of Phosphorus in Animal Nutrition," *Poultry Science* 74:1659-1670, 1995.
Nagy et al., "Peco Fluorine Removal Process Pilot Plant," *AICHE Clearwater Convention*:May 23, 1998, (11 pages).
Tessenderlo Group, "Talking Feed Ingredients," *Quality Feed Ingredients*:May 2006, (5 pages).

* cited by examiner

*Primary Examiner* — James A Fiorito
(74) *Attorney, Agent, or Firm* — Seed IP Law Group LLP

(57) ABSTRACT

Methods are disclosed for producing a calcium phosphate salt comprising reacting fluorosilicic acid (FSA) with water and a calcium phosphate source to produce phosphoric acid, calcium fluoride, and silicon dioxide; removing residual solids; performing a first stage precipitation wherein the phosphoric acid generated previously is reacted with a calcium source and water to remove residual fluoride; and performing a second stage precipitation wherein the phosphoric acid generated previously is reacted with a calcium source and water to isolate the product calcium phosphate salt, having a low level of impurities.

20 Claims, 1 Drawing Sheet

METHOD FOR PRODUCING A CALCIUM PHOSPHATE SALT

BACKGROUND

Technical Field

This invention relates to methods for manufacturing a calcium phosphate salt starting from the reaction of a fluorosilicic acid (FSA) source with a calcium phosphate source to produce phosphoric acid, followed by reaction of the phosphoric acid produced with a calcium source to form the calcium phosphate salt, and isolation of the calcium phosphate salt, having a low level of impurities.

Description of the Related Art

Dicalcium phosphate is commonly used as a source of supplemental phosphorus. Commercial grade dicalcium phosphate is not a chemically defined entity, but in fact a mixture of varying amounts of dicalcium and monocalcium phosphates, phosphorous, calcium, and impurities, depending on the origin of the raw material and procedures employed in its industrial production. Considered to be a safe source of phosphorous, dicalcium phosphate (DCP) is largely used in animal feeds all over the world with varying chemical and physical specifications required to achieve commercial grade. Commercial grade DCP typically requires a phosphorous to fluoride (P:F) ratio of greater than 100 to meet industry standards.

Production of DCP requires a source of phosphoric acid. The phosphoric acid manufacturing process produces hazardous fluoride vapors that are captured and concentrated in several parts of the processing plant, mainly in the reaction and evaporation sections. Scrubbing systems have been developed that are capable of producing very high fluoride concentrations and a small portion of the effluent produced is sold to the water treatment industry for drinking water fluoridation. The fluoride compounds captured are primarily HF, silica tetra-fluoride ($SiF_4$) and fluorosilicic acid ($H_2SiF_6$), commonly referred to as FSA.

As large amounts of fluoride solution are produced and the market for these compounds are small, most of the industry captures the fluoride vapors at low concentrations and allows the compounds to re-circulate and concentrate in cooling ponds until large amounts precipitate as sodium and potassium salts. As cooling water accumulates, excess water must be neutralized with lime (CaO) before being discharged to fresh water systems. The cost of lime and operating the associated liming equipment could approach $30 million per year for a 500,000 $P_2O_5$ ton per year facility.

Known techniques in the art disclose reacting fluorosilicic acid (FSA) with phosphate rock to produce an intermediate strength phosphoric acid (16% to 20% $P_2O_5$) and calcium fluoride, $CaF_2$ (see, e.g., Erickson et al., U.S. Pat. Nos. 5,180,569, 5,427,757, and 5,531,975). The reaction is presented in Equation (1).

$$H_2SiF_6+Ca_3(PO_4)_2+2H_2O \rightarrow 2H_3PO_4+3CaF_2+SiO_2 \quad \text{Equation (1)}$$
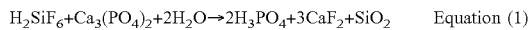

Erickson et al., employed FSA at concentrations of 17-30%, no lower than approximately 17% when dry phosphate rock was used and no lower than 20% when wet phosphate rock was being processed. Additionally, the FSA reaction was maintained at least approximately 90° C. and normally between 90-110° C.

Hilakos and Nagy later demonstrated that lower strength FSA in the range of 5-15% and temperatures of 90.5-93° C. could effectively be used for the FSA reaction in Equation (1) (Hilakos S. W., Nagy J. M., AICHE Clearwater Convention, May 23, 1998). They also demonstrated that one of the key aspects of the reaction for getting good conversion of $H_2SiF_6$ to $CaF_2$ is to have an optimal Ca:F ratio.

The focus of the Erickson et al.'s work described above was to produce a commercial grade of $CaF_2$ that could be used to produce HF. Hilakos et al.'s work described above focused on the neutralization of fluoride. However, the present invention envisions utilization of the phosphoric acid produced as a phosphate source for the production of DCP.

Animal diets based on corn and soybean meal mixtures are very deficient in available phosphorous to the point that supplementation is always necessary (Fernandez et al., *Poultry Science*, Volume 78, Issue 12, 1 Dec. 1999, Pages 1729-1736). Current global phosphorous reserves may be depleted in 50-100 years, which poses the challenge of securing future phosphorous supply for the global animal feed industries (Li et al., Agriculture, 2016, 6, 25).

Accordingly, there is a need in the art for improved techniques for a process for neutralizing weak fluoride solutions with a calcium phosphate source and using the liquor from that reaction to produce DCP for use in an animal feed ingredient that meets the varying industry standards. The present invention fulfils this need and provides other advantages as evident from the following description.

BRIEF SUMMARY

The present invention can be used to produce di-calcium phosphate (DCP) (e.g., for use as an animal feed product), from the phosphoric acid liquor produced when fluorosilicic acid (FSA) is reacted with a calcium phosphate source to produce phosphoric acid and calcium fluoride (see, Equation 1).

$$H_2SiF_6+Ca_3(PO_4)_2+2H_2O \rightarrow 2H_3PO_4+3CaF_2+SiO_2 \quad \text{Equation 1)}$$

The present invention couples Equation 1 with a neutralization step wherein the phosphoric acid produced is reacted with a calcium source, as indicated in Equation 2, to produce a DCP product (depicted below as dihydrate di-calcium phosphate ($CaHPO_4*2H_2O$), but may also be produced as anhydrous di-calcium phosphate ($CaHPO_4$) or a mixture of the two as described herein).

$$H_3PO_4+CaO+H_2O \rightarrow CaHPO_4*2H_2O \quad \text{Equation 2)}$$

The present invention presents several key advantages. One advantage of the present invention is use of a weak FSA source in step (a). Because a weak source of FSA can be utilized, more options are available to source the FSA required for step (a) of the present invention. A further advantage of utilizing a weak source of FSA is that the avoided cost is considerable (e.g., avoided equipment cost in the form of employing single stage scrubbers versus adding additional scrubbers). A further advantage of utilizing a weak source of FSA is the ease of solid separation and ease of recovery of $P_2O_5$.

Additionally, it is advantageous that the present invention can produce a mixture of dihydrate di-calcium phosphate ($CaHPO_4*2H_2O$) and anhydrous di-calcium phosphate ($CaHPO_4$), substantially dihydrate di-calcium phosphate ($CaHPO_4*2H_2O$), or substantially anhydrous di-calcium phosphate ($CaHPO_4$). Under certain circumstances, producing substantially dihydrate di-calcium phosphate ($CaHPO_4*2H_2O$) may be advantageous for bioavailability in animals (see, e.g., Talking Feed Ingredients, Newsletter May 2006, page 4). However, it may also be advantageous to produce substantially anhydrous di-calcium phosphate ($CaHPO_4$) as the product produced would have a lower weight and therefore result in lower shipping costs.

Further, an advantage of the present invention is that DCP can be produced with low levels of impurities. It is advantageous to use weak FSA as opposed to stronger acids (e.g., HCl, $H_2SO_4$, and the like), because certain metals including iron (Fe) and aluminum (Al) have little to no solubility in the weak FSA solution. Thus, less Fe and Al impurities are present and require removal via precipitation, leading to a higher purity DCP product. Furthermore, use of weak FSA as opposed to stronger acids (e.g., HCl, $H_2SO_4$, and the like), is advantageous due to fewer heavy metals and radioactive elements being dissolved in the process and therefore less product contamination.

An advantage of the present invention is that multiple sources of calcium phosphate may be utilized, even those typically thought of as waste. For example, waste streams from phosphate beneficiation plants can be used as a calcium phosphate source in step (a). Use of waste streams represents an economic advantage because waste streams have little to no economic value and their disposal may even incur costs. As such, use of waste streams to produce a DCP product with low levels of impurities can be profitable. Further, utilizing waste streams conserves phosphorous by tapping a source that would otherwise be discarded.

Moreover, use of run of mine ore in the production of DCP cuts out need for processing in a beneficiation plant, which lowers costs and conserves phosphorous because no phosphorous is lost to waste streams produced in the process of beneficiation.

In brief, methods for producing a calcium phosphate salt are provided. In some embodiments a method for producing di-calcium phosphate (DCP) is provided comprising: (a) reacting fluorosilicic acid (FSA) with water and a calcium phosphate source to produce phosphoric acid, calcium fluoride, and silicon dioxide; (b) removing residual solids; (c) performing a first stage precipitation wherein the phosphoric acid generated previously is reacted with a calcium source and water to remove residual fluoride; and performing a second stage precipitation wherein the phosphoric acid generated previously is reacted with a calcium source and water to isolate the product, the calcium phosphate salt having a low fluoride content.

In some embodiments, in step (a) the reaction is performed at about 70-100° C. In some embodiments, in step (a) the reaction is sustained for about 20-60 minutes. In some embodiments, in step (a) the FSA is weak FSA. In some embodiments, in step (a) the FSA concentration is about 3-15%, or above. In some embodiments, the ratio of Ca:F in step (a) is about 1.4:1 to about 1:1.

In some embodiments, a method is provided for producing di-calcium phosphate (DCP). In some embodiments, the DCP product produced is a mixture of dihydrate di-calcium phosphate ($CaHPO_4 \cdot 2H_2O$) and anhydrous di-calcium phosphate ($CaHPO_4$). In some embodiments, the DCP product produced is about 90:10, about 80:20, about 70:30, about 60:40, or about 50:50 dihydrate di-calcium phosphate ($CaHPO_4 \cdot 2H_2O$) to anhydrous di-calcium phosphate ($CaHPO_4$). In some embodiments, the DCP product produced is substantially dihydrate di-calcium phosphate ($CaHPO_4 \cdot 2H_2O$). In other embodiments, the DCP product produced is substantially anhydrous di-calcium phosphate ($CaHPO_4$).

In some embodiments, the DCP product produced has a low level of heavy metal content. In some embodiments the heavy metal impurities, when present, are selected from arsenic (As), cadmium (Cd), vanadium (V), chromium (Cr), mercury (Hg), and lead (Pb), or a combination thereof. In some embodiments, in step (d) the DCP product produced contains about 200 ppm to about 10 ppm, or less of heavy metal(s). In some embodiments, the DCP product produced contains about 200 ppm, about 150 ppm, about 100 ppm, about 50 ppm, about 40 ppm, about 30 ppm, about 25 ppm, about 20 ppm, about 10 ppm or less of heavy metal(s). In some embodiments, the DCP product produced has low arsenic (As) content. In some embodiments, the DCP product produced contains about 20 ppm, about 10 ppm, or less of As. In some embodiments, the DCP product produced has low cadmium (Cd) content. In some embodiments, DCP product produced contains about 20 ppm, about 10 ppm, or less of Cd.

In some embodiments, in the DCP product produced has a low level of radioactive elements including $Po^{210}$, $Pb^{210}$, $U^{234}$, $U^{235}$, $U^{238}$, $Ra^{226}$, $Ra^{228}$, $K^{40}$, $Th^{228}$, $Th^{230}$, or $Th^{232}$, or a combination thereof.

In some embodiments, the DCP product produced has a high phosphorus to fluoride (P:F) ratio. In some embodiments, in step (d) the DCP product produced contains a ratio of P:F of about 100:1 to about 300:1. In some embodiments, the DCP product produced contains a ratio of P:F of about 100:1, about 200:1, about 250:1, or about 300:1.

In some embodiments, the DCP product produced has a low level of fluorides. In some embodiments, in step (d) the DCP product produced contains about 0.2% to about 0.001%, or less of fluorides. In some embodiments, the DCP product produced contains about 0.2%, about 0.1%, about 0.05%, about 0.01%, about 0.005%, about 0.001%, or less of fluorides.

In some embodiments, in step (d) the DCP product produced contains a ratio of calcium to phosphorous (Ca:P) of about 1.5:1 to about 1:1. In some embodiments, the DCP product produced contains a ratio of calcium to phosphorous (Ca:P) of about 1.5:1, about 1.3:1, about 1.2:1, or about 1:1, by percent weight.

In some embodiments, the DCP product produced contains about 20-30% Ca. In some embodiments, the DCP product produced contains about 15-20% P.

In some embodiments, the DCP product produced has a low level of metal oxide content. In some embodiments, in step (d) the DCP product produced contains about 1.0% to about 0.02%, or less of $Fe_2O_3$. In some embodiments, the DCP product produced contains about 1.0%, about 0.5%, about 0.1%, about 0.02%, or less of $Fe_2O_3$. In some embodiments, in step (d) the DCP product produced contains about 1.0% to about 0.05%, or less of $Al_2O_3$. In some embodiments, the DCP product produced contains about 1.0%, about 0.5%, about 0.1%, about 0.05% or less of $Al_2O_3$.

In some embodiments, in step (a) the calcium phosphate source is phosphate rock concentrate. In some embodiments, in step (a) the calcium phosphate source is run of mine ore. In some embodiments, in step (a) the calcium phosphate source is a waste stream from a phosphate beneficiation plant.

In some embodiments, the calcium source is calcium oxide, calcium hydroxide, or calcium carbonate.

In some embodiments, in step (c) the precipitation is performed at about pH 3-4 or about pH 3.2.

In some embodiments, in step (d) the precipitation is performed at about pH 4-7, about pH 5-5.5, about pH 5.5-7, about pH 6-7, or about pH 7.

In some embodiments, in step (d) the precipitation is performed at about 60-100° C., about 60-90° C., about 60-80° C., about 60-70° C., about 60-50° C., about 50-40° C., about 40-30° C., about 30-25° C. or less. In some embodiments, in step (d) the precipitation is performed at about 100° C., about 90° C., about 80° C., about 70° C., about 60° C., about 50° C., about 40° C., about 30° C., about 25° C. or less.

In some embodiments in step (d) the precipitation is performed at a temperature between about 25-100° C. such that the temperature decreases as the concentration of phosphate in the solution increases.

In some embodiments, the method comprises one or more additional precipitation steps. In some embodiments, the one or more additional precipitation steps occurs between steps (c) and (d). In some embodiments, the one or more additional precipitation steps removes heavy metal impurities. In some embodiments, the heavy metal impurities, when present, are selected from As, Cd, V, Cr, Hg, and Pb, or a combination thereof. In some embodiments, the one or more additional precipitation steps occurs at a pH suitable to remove specific heavy metal species present. In some embodiments, the one or more additional precipitation steps occurs between steps (c) and (d), wherein Cd is removed at a pH of about 4-4.5. In some embodiments, the one or more additional precipitation steps occurs between steps (c) and (d), wherein As is removed at a pH of about 5.5-7.

In some embodiments, the method further comprises an additive. In some embodiments, the additive used has the following structure of formula (I):

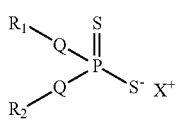

(I)

wherein

Q is a bond or O;

$R_1$ and $R_2$ are independently H, or a linear or branched alkyl, wherein at least one of $R_1$ and $R_2$ is not H; and X is H, an alkali metal or ammonium.

In other embodiments, the additive used in has the following structure of formula (II):

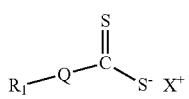

(II)

wherein

Q is a bond or O;

$R_1$ is a linear or branched alkyl; and

X is H, an alkali metal or ammonium.

In some embodiments, the additive is di-butyl dithiophosphate. In some embodiments, the additive is di-butyl dithiophosphinate. In some embodiments, the additive is butyl xanthate.

In some embodiments, step (a) undergoes a solid separation step prior to step (c). In some embodiments, step (c) undergoes a solid separation step prior to step (d). In some embodiments, the additional precipitation, when present, step undergoes a solid separation step.

In some embodiments, step (c) undergoes a clarification step prior to step (d). In some embodiments, the additional precipitation step, when present, undergoes a clarification step. In some embodiments, step (c) undergoes a clarification step wherein the first cut solids are recycled into step (a).

In some embodiments, the precipitate produced in a given step is recycled for use in a previous step. In some embodiments, the filter wash water produced in a given step is recycled for use in a previous step.

In some embodiments, a method for producing a calcium phosphate salt is provided comprising: (a) digesting a first calcium phosphate source using an aqueous solution of fluorosilicic acid (FSA), to form a liquor consisting of an aqueous phase comprising phosphate ions in solution, and a first insoluble solid phase containing impurities; (b) separating the aqueous phase comprising phosphate ions in solution from the first insoluble solid phase containing impurities; (c) performing a first stage precipitation wherein said aqueous phase comprising phosphate ions in solution is neutralized with a calcium source at a pH sufficient to precipitate the excess fluoride in solution; and (d) performing a second stage precipitation wherein said aqueous phase comprising phosphate ions in solution is neutralized with a calcium source at a pH sufficient to isolate the product calcium phosphate salt.

DETAILED DESCRIPTION

Definitions

Figure 1:
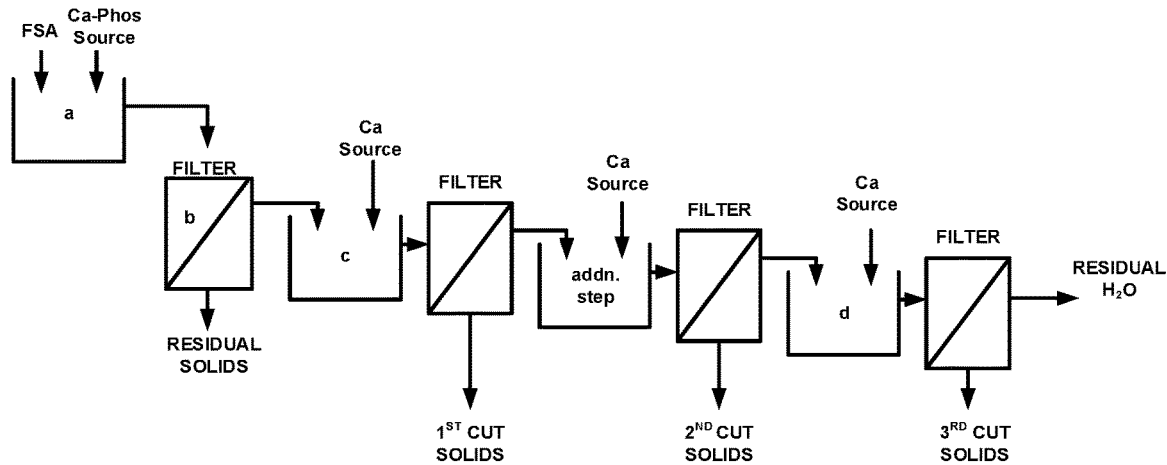
FIG. 1 depicts a specific exemplary embodiment of the invention wherein, the workflow comprises: (a) reacting FSA with a calcium phosphate source; (b) a solid filtration step to remove residual solids; (c) a first stage precipitation with a calcium source followed by a solid filtration step; an additional precipitation step with a calcium source between steps (c) and (d) followed by a solid filtration step; and (d) a final stage precipitation with a calcium source followed by a solid filtration step.

Unless the context requires otherwise, throughout this specification and claims, the words "comprise," "comprising" and the like are to be construed in an open, inclusive sense; the words "a," "an," and the like are to be considered as meaning at least one and are not limited to just one. Terms not specifically defined herein should be given the meanings that would be given to them by one of skill in the art in light of the disclosure and the context.

Reference to a value being "about" a given number means that the value is within a range of plus-or-minus (±) 25% of the number specified. For example, reference to "about 100 ppm" includes from plus 25% to minus 25% of this number, or from 75-125 ppm. Similar calculations may be made for all other values or ranges provided herein when proceeded by the term "about". In more specific embodiments, about refers to a range that is ±20% of the number specified, ±15% of the number specified, ±10% of the number specified, ±5% of the number specified, ±2% of the number specified, or ±1% of the number specified.

"Calcium phosphate source" refers to a source such as phosphate rock concentrate, run of mine ore, or a waste stream from a phosphate beneficiation plant, or another source of calcium phosphate as is readily understood by a person of skill in the art.

"Calcium source" refers to a source of calcium such as calcium oxide, calcium hydroxide, calcium carbonate, or the like as is readily understood by a person of skill in the art.

"Additive" refers to a reagent that can form a complex with a heavy metal (such as arsenic, cadmium, vanadium, chromium, mercury, or lead, or a combination thereof) and facilitate precipitation of the heavy metal. For example, the reagent may be a di-lower alkyl dithiophosphinate, di-lower alkyl dithiophosphate, lower alkyl dithioate, or lower alkyl xanthate. In some embodiments, the lower alkyl substituent is a linear or branched $C_{1-4}$ alkyl. For example, the complex reagent is an ammonium, sodium, or potassium salt of di-isobutyl dithiophosphate, di-isobutyl dithiophosphinate, 2-methylpropanedithioate, or isobutyl xanthate. When the carbon chain is prolonged (e.g., the carbon number is 5 or more), the reagent tends to precipitate in the acidic solution.

"Solid separation" refers to one or more conventional filtration steps, e.g., by a plate and frame filter, flotation separation, active carbon separation, vacuum filtration, pressure filtration, gravity filtration, compression filtration, magnetic filtration and/or other liquid/solid separation techniques known in the art.

A "low level" means different values in reference to the material in question and will be understood to fall within the ranges specified depending on the material referenced. For example, in some embodiments, a "low level" as related to arsenic (Ar) means that the DCP product produced contains about 20 ppm, about 10 ppm, or less of As. Further for example, in some embodiments, a "low level" as related to fluorides means that the DCP product produced contains about 0.2%, about 0.1%, about 0.05%, about 0.01%, about 0.005%, about 0.001% or less of fluorides.

"USD" means United States dollars.

"Anhydrous" di-calcium phosphate ($CaHPO_4$) is used herein to denote dicalcium phosphate substantially free from water of crystallization as distinguished from hydrates such as dihydrate di-calcium phosphate ($CaHPO_4 \cdot 2H_2O$). The term does not imply the absence of free water.

"Bq" or "Becquerel" is the SI derived unit of radioactivity. One becquerel is defined as the activity of a quantity of radioactive material in which one nucleus decays per second.

"° C." means degrees Celsius.

"ppm" means parts per million.

"Residual" when referring to solids or water as described herein means the remaining solids or water after a step as described herein, which may be disposed of as waste or recycled for further use.

"alkyl" refers to a straight or branched hydrocarbon chain radical consisting solely of carbon and hydrogen atoms, which is attached to the rest of the molecule by a single bond, e.g., methyl, ethyl, n-propyl, 1-methylethyl (iso-propyl), n-butyl, n-pentyl, 1,1-dimethylethyl (t-butyl), 3-methylhexyl, 2-methylhexyl, and the like.

Throughout this document, quantities expressed in ppm are all made on a weight basis. Quantities expressed as ratios are in units of percent by weight.

Accordingly, in some embodiments, a method is provided for producing di-calcium phosphate (DCP) comprising: (a) reacting fluorosilicic acid (FSA) with water and a calcium phosphate source to produce phosphoric acid, calcium fluoride, and silicon dioxide; (b) removing residual solids; (c) performing a first stage precipitation wherein the phosphoric acid generated in step (a) is reacted with a calcium source and water to remove residual fluoride; and (d) performing a second stage precipitation wherein the residual phosphoric acid from step (c) is reacted with a calcium source and water to isolate the product DCP.

A minimum temperature is required to sustain the reaction in step (a) and requires supplemental heating as the reaction does not provide enough heat to sustain itself and heat the feed ingredients. In some embodiments, in step (a) the reaction is performed at about 70-100° C. In some embodiments, in step (a) the reaction is performed at about 70° C., about 75° C., about 80° C., about 90° C., or about 100° C. In specific embodiments, in step (a) the reaction is performed at about 70° C. In specific embodiments, in step (a) the reaction is performed at about 75° C. In specific embodiments, in step (a) the reaction is performed at about 80° C. In specific embodiments, in step (a) the reaction is performed at, about 90° C. In specific embodiments, in step (a) the reaction is performed at about 100° C. In some embodiments an additional heat source is employed (e.g., a steam jacketed vessel may be used to heat the reaction in step (a)).

In some embodiments, in step (a) the reaction is sustained for about 20-60 minutes. In some embodiments, in step (a) the reaction is sustained for about 20-40 minutes. In some embodiments, in step (a) the reaction is sustained for about 20 minutes. In some embodiments, in step (a) the reaction is sustained for about 25 minutes. In some embodiments, in step (a) the reaction is sustained for about 30 minutes. In some embodiments, in step (a) the reaction is sustained for about 35 minutes. In some embodiments, in step (a) the reaction is sustained for about 40 minutes. In some embodiments, in step (a) the reaction is sustained for about 50 minutes. In some embodiments, in step (a) the reaction is sustained for about 60 minutes.

In some embodiments, in step (a) the reaction is performed at about 70-100° C. and is sustained for about 20-60 minutes. In some embodiments, in step (a) the reaction is performed at about 70-100° C. and is sustained for about 20-40 minutes. In some embodiments, in step (a) the reaction is performed at about 70-100° C. and is sustained for about 20-30 minutes.

A key advantage of the present invention is use of a weak FSA source in step (a). One advantage is that because a weak source of FSA can be utilized, more options are available to source the FSA required for step (a) of the present invention. Another advantage to the use of weak FSA is that the solid separation step may be performed more easily. It should be noted that Erickson et al., did not anticipate that weak FSA would work in the reaction. Erickson used not less than 17% FSA, whereas step (a) of the present invention can be accomplished with lower percentages of FSA as a source. A further advantage of utilizing a weak source of FSA is that the avoided cost is considerable (e.g., avoided equipment cost in the form of employing single stage scrubbers versus adding additional scrubbers). A further advantage of utilizing a weak source of FSA is the ease of solid separation and ease of recovery of $P_2O_5$.

In some embodiments, in step (a) the FSA is weak FSA. In some embodiments, in step (a) the FSA concentration is 3-15%, or above. In some embodiments, in step (a) the FSA concentration is about 3-15%. In some embodiments, in step (a) the FSA concentration is about 3%. In some embodiments, in step (a) the FSA concentration is about 5%. In some embodiments, in step (a) the FSA concentration is about 10%. In some embodiments, in step (a) the FSA concentration is about 15%.

An advantage of the present invention is that the ratio of calcium to fluoride (Ca:F) employed in step (a), can be altered for efficiency based on the composition of the calcium phosphate source with the goal of producing the most DCP product per unit of F while also substantially neutralizing the F in solution. The higher the Ca:F ratio, the less efficient use of the calcium phosphate source. However, if the Ca:F ratio is too low, then more F is left un-neutralized in solution. The ideal ratio depends on the calcium phosphate source employed in step (a), in accordance with the ranges set forth below. In some embodiments, the ratio of Ca:F in step (a) is about 1.4:1 to about 1:1. In some embodiments, the ratio of Ca:F in step (a) is about 1.4:1, about 1.3:1, about 1.25:1, about 1.2:1, or about 1:1. In some embodiments, the ratio of Ca:F in step (a) is about 1.4:1. In some embodiments, the ratio of Ca:F in step (a) is about 1.3:1. In some embodiments, the ratio of Ca:F in step (a) is about 1.25:1. In some embodiments, the ratio of Ca:F in step (a) is about 1.2:1. In some embodiments, the ratio of Ca:F in step (a) is about 1:1. The above ratios are given in units of % by weight.

It is advantageous that the present invention can produce a mixture of dihydrate di-calcium phosphate ($CaHPO_4*2H_2O$) and anhydrous di-calcium phosphate ($CaHPO_4$), substantially dihydrate di-calcium phosphate ($CaHPO_4*2H_2O$), or substantially anhydrous di-calcium phosphate ($CaHPO_4$). As the temperature at which the precipitation is performed in step (d) increases, the ratio of anhydrous di-calcium phosphate ($CaHPO_4$) to dihydrate di-calcium phosphate ($CaHPO_4*2H_2O$) produced also increases. Under certain circumstances, producing substantially dihydrate di-calcium phosphate ($CaHPO_4*2H_2O$) may be advantageous for bioavailability in animals (see, e.g., Talking Feed Ingredients, Newsletter May 2006, page 4). Under certain circumstances, producing substantially anhydrous di-calcium phosphate ($CaHPO_4$) may be advantageous as the product produced would have a lower weight and therefore result in lower shipping costs.

In some embodiments, in step (d) the DCP product produced is substantially dihydrate di-calcium phosphate ($CaHPO_4*2H_2O$). In some embodiments, in step (d) the DCP product produced is substantially anhydrous di-calcium phosphate ($CaHPO_4$). In other embodiments, in step (d) the DCP product produced is a mixture of dihydrate di-calcium phosphate ($CaHPO_4*2H_2O$) and anhydrous di-calcium phosphate ($CaHPO_4$). In certain embodiments, in step (d) the DCP product produced is about 90:10, about 80:20, about 70:30, about 60:40, or about 50:50 dihydrate di-calcium phosphate ($CaHPO_4*2H_2O$) to anhydrous di-calcium phosphate ($CaHPO_4$). In certain embodiments, in step (d) the DCP product produced is about 90:10 dihydrate di-calcium phosphate ($CaHPO_4*2H_2O$) to anhydrous di-calcium phosphate ($CaHPO_4$). In certain embodiments, in step (d) the DCP product produced is about 80:20 dihydrate di-calcium phosphate ($CaHPO_4*2H_2O$) to anhydrous di-calcium phosphate ($CaHPO_4$). In certain embodiments, in step (d) the DCP product produced is about 70:30 dihydrate di-calcium phosphate ($CaHPO_4*2H_2O$) to anhydrous di-calcium phosphate ($CaHPO_4$). In certain embodiments, in step (d) the DCP product produced is about 60:40 dihydrate di-calcium phosphate ($CaHPO_4*2H_2O$) to anhydrous di-calcium phosphate ($CaHPO_4$). In certain embodiments, in step (d) the DCP product produced is about 50:50 dihydrate di-calcium phosphate ($CaHPO_4*2H_2O$) to anhydrous di-calcium phosphate ($CaHPO_4$).

An advantage of the present invention is that DCP can be produced with low levels of impurities. Characteristics of dicalcium phosphates vary according to the origin of the raw materials used in production and methods of production. Potentially harmful or toxic impurities may be present that are disadvantageous or not allowed in a commercially viable DCP product (see, e.g., Lima et al., *Poultry Science*, 1995, 74:1659-1670).

In some embodiments, in step (d) the DCP product produced has a low level of heavy metal(s). In some embodiments the heavy metal impurities, when present, are selected from arsenic (As), cadmium (Cd), vanadium (V), chromium (Cr), mercury (Hg), and lead (Pb), or a combination thereof. In some embodiments, in step (d) the DCP product produced contains about 500 ppm to about 5 ppm, or less of heavy metal(s). In some embodiments, in step (d) the DCP product produced contains about 200 ppm to about 5 ppm, or less of heavy metal(s). In some embodiments, in step (d) the DCP product produced contains about 500 ppm, about 400 ppm, about 300 ppm, about 250 ppm, about 200 ppm, about 150 ppm, about 100 ppm, about 50 ppm, about 40 ppm, about 30 ppm, about 25 ppm, about 20 ppm, about 10 ppm, about 5 ppm, or less of heavy metal(s). In certain embodiments, in step (d) the DCP product produced contains about 500 ppm or less of heavy metal(s). In certain embodiments, in step (d) the DCP product produced contains about 400 ppm or less of heavy metal(s). In certain embodiments, in step (d) the DCP product produced contains about 300 ppm or less of heavy metal(s). In certain embodiments, in step (d) the DCP product produced contains about 250 ppm or less of heavy metal(s). In certain embodiments, in step (d) the DCP product produced contains about 200 ppm or less of heavy metal(s). In certain embodiments, in step (d) the DCP product produced contains about 150 ppm or less of heavy metal(s). In certain embodiments, in step (d) the DCP product produced contains about 100 ppm or less of heavy metal(s). In certain embodiments, in step (d) the DCP product produced contains about 50 ppm or less of heavy metal(s). In certain embodiments, in step (d) the DCP product produced contains about 40 ppm or less of heavy metal(s). In certain embodiments, in step (d) the DCP product produced contains about 30 ppm or less of heavy metal(s). In certain embodiments, in step (d) the DCP product produced contains about 25 ppm or less of heavy metal(s). In certain embodiments, in step (d) the DCP product produced about 20 ppm or less of heavy metal(s). In certain embodiments, in step (d) the DCP product produced contains about 10 ppm or less of heavy metal(s). In certain embodiments, in step (d) the DCP product produced contains about 5 ppm or less of heavy metal(s). In some embodiments, the heavy metal(s) are selected from As, Cd, V, Cr, Hg, and Pb, or a combination thereof.

In some embodiments, in step (d) the DCP product produced has a low level of arsenic (As). In some embodiments, in step (d) the DCP product produced contains about 20 ppm to about 5 ppm, or less of As. In some embodiments, in step (d) the DCP product produced contains about 20 ppm, about 10 ppm, about 5 ppm, or less of As. In certain embodiments, in step (d) the DCP product produced contains about 20 ppm or less of As. In certain embodiments, in step (d) the DCP product produced contains about 10 ppm or less of As. In certain embodiments, in step (d) the DCP product produced contains about 5 ppm or less of As.

In some embodiments, in step (d) the DCP product produced has a low level of cadmium (Cd). In some embodiments, in step (d) the DCP product produced contains about 50 ppm to about 5 ppm, or less of Cd. In some embodiments, in step (d) the DCP product produced contains about 50 ppm, about 40 ppm, about 30 ppm, about 20 ppm, about 10 ppm, about 5 ppm, or less of Cd. In certain embodiments, in step (d) the DCP product produced contains about 50 ppm or less of Cd. In certain embodiments, in step (d) the DCP product produced contains about 40 ppm or less of Cd. In certain embodiments, in step (d) the DCP product produced contains about 30 ppm or less of Cd. In certain embodiments, in step (d) the DCP product produced contains about 20 ppm or less of Cd. In certain embodiments, in step (d) the DCP product produced contains about 10 ppm or less of Cd. In certain embodiments, in step (d) the DCP product produced contains about 5 ppm or less of Cd.

In some embodiments, in step (d) the DCP product produced has a low level of vanadium (V). In some embodiments, in step (d) the DCP product produced contains about 200 ppm to about 50 ppm, or less of V. In some embodiments, in step (d) the DCP product produced contains about 200 ppm, about 150 ppm, about 100 ppm, about 50 ppm, or less of V. In certain embodiments, in step (d) the DCP product produced contains about 200 ppm or less of V. In certain embodiments, in step (d) the DCP product produced contains about 150 ppm or less of V. In certain embodiments, in step (d) the DCP product produced contains about 100 ppm or less of V. In certain embodiments, in step (d) the DCP product produced contains about 50 ppm or less of V.

In some embodiments, in step (d) the DCP product produced has a low level of chromium (Cr). In some embodiments, in step (d) the DCP product produced contains about 500 ppm to about 50 ppm, or less of Cr. In some embodiments, in step (d) the DCP product produced contains about 500 ppm, about 250 ppm, about 100 ppm, about 50 ppm, or less of Cr. In certain embodiments, in step (d) the DCP product produced contains about 500 ppm or less of Cr. In certain embodiments, in step (d) the DCP product produced contains about 250 ppm or less of Cr. In certain embodiments, in step (d) the DCP product produced contains about 100 ppm or less of Cr. In certain embodiments, in step (d) the DCP product produced contains about 50 ppm or less of Cr.

In some embodiments, in step (d) the DCP product produced has a low level of mercury (Hg). In some embodiments, in step (d) the DCP product produced contains about 1 ppm to about 0.1 ppm, or less of Hg. In some embodiments, in step (d) the DCP product produced contains about 1 ppm, about 0.5 ppm, about 0.1 ppm, or less of Hg. In certain embodiments, in step (d) the DCP product produced contains about 1 ppm or less of Hg. In certain embodiments, in step (d) the DCP product produced contains about 0.5 ppm or less of Hg. In certain embodiments, in step (d) the DCP product produced contains about 0.1 ppm or less of Hg.

In some embodiments, in step (d) the DCP product produced has a low level of lead (Pb). In some embodiments, in step (d) the DCP product produced contains about 30 ppm to about 5 ppm, or less of Pb. In some embodiments, in step (d) the DCP product produced contains about 30 ppm, about 20 ppm, about 10 ppm, about 5 ppm, or less of Pb. In certain embodiments, in step (d) the DCP product produced contains about 30 ppm or less of Pb. In certain embodiments, in step (d) the DCP product produced contains about 20 ppm or less of Pb. In certain embodiments, in step (d) the DCP product produced contains about 10 ppm or less of Pb. In certain embodiments, in step (d) the DCP product produced contains about 5 ppm or less of Pb.

Production of a phosphate salt that is suitable for use in a formulation or a composition intended for agriculture or the food industry or adapted to be used for the preparation of a formulation or a composition intended for agriculture or the food industry, wherein at least a portion of the content of radioactive elements or metallic impurities or heavy metals or transition metals is reduced, is known in the art (see, e.g., Takhim, U.S. Ser. No. 10/464,853). Here, use of weak FSA as opposed to hydrochloric acid (HCl) or sulfuric acid ($H_2SO_4$) is likely advantageous due to fewer radioactive elements being dissolved in the process and therefore less product contamination. In some embodiments, in step (d) the DCP product produced has a low level of radioactive elements including $Po^{210}$, $Ph^{210}$, $U^{234}$, $U^{235}$, $U^{238}$, $Ra^{226}$, $Ra^{228}$, $K^{40}$, $Th^{228}$, $Th^{230}$, or $Th^{232}$, or a combination thereof.

In some embodiments, in step (d) the DCP product produced has a high phosphorus to fluoride (P:F) ratio. In some embodiments, in step (d) the DCP product produced contains a ratio of P:F of about 100:1 to about 300:1. In some embodiments, in step (d) the DCP product produced contains a ratio of P:F of about 100:1, about 200:1, about 250:1, or about 300:1. In certain embodiments, in step (d) the DCP product produced contains a ratio of P:F of about 100:1. In certain embodiments, in step (d) the DCP product produced contains a ratio of P:F of about 200:1. In certain embodiments, in step (d) the DCP product produced contains a ratio of P:F of about 250:1. In certain embodiments, in step (d) the DCP product produced contains a ratio of P:F of about 300:1. The above ratios are given in units of % by weight.

In some embodiments, in step (d) the DCP product produced has a low level of fluorides. In some embodiments, in step (d) the DCP product produced contains about 0.2% to about 0.001%, or less of fluorides. In some embodiments, in step (d) the DCP product produced contains about 0.2%, about 0.1%, about 0.05%, about 0.01%, about 0.005%, about 0.001%, or less of fluorides. In certain embodiments, in step (d) the DCP product produced contains about 0.2% or less of fluorides. In certain embodiments, in step (d) the DCP product produced contains about 0.1% or less of fluorides. In certain embodiments, in step (d) the DCP product produced contains about 0.05% or less of fluorides. In certain embodiments, in step (d) the DCP product produced contains about 0.01% or less of fluorides. In certain embodiments, in step (d) the DCP product produced contains about 0.005% or less of fluorides. In certain embodiments, in step (d) the DCP product produced contains about 0.001% or less of fluorides.

In some embodiments, in step (d) the DCP product produced contains a ratio of calcium to phosphorous (Ca:P) of about 1.5:1 to about 1:1. In some embodiments, in step (d) the DCP product produced contains a ratio of calcium to phosphorous (Ca:P) of about 1.5:1, about 1.3:1, about 1.2:1, or about 1:1. In some embodiments, in step (d) the DCP product produced contains a ratio of calcium to phosphorous (Ca:P) of about 1.5:1. In some embodiments, in step (d) the DCP product produced contains a ratio of calcium to phosphorous (Ca:P) of about 1.3:1. In some embodiments, in step (d) the DCP product produced contains a ratio of calcium to phosphorous (Ca:P) of about 1.2:1. In some embodiments, in step (d) the DCP product produced contains a ratio of calcium to phosphorous (Ca:P) of about 1:1. The above ratios are given in units of % by weight.

In some embodiments, in step (d) the DCP product produced contains about 20-30% Ca. In certain embodiments, in step (d) the DCP product produced contains about 30% Ca. In certain embodiments, in step (d) the DCP product produced contains about 25% Ca. In certain embodiments, in step (d) the DCP product produced contains about 20% Ca.

In some embodiments, in step (d) the DCP product produced contains about 15-20% P. In certain embodiments, in step (d) the DCP product produced contains about 20% P. In certain embodiments, in step (d) the DCP product produced contains about 15% P.

Another advantage of the present invention is that use of weak FSA as opposed to stronger acids (e.g., HCl, $H_2SO_4$, and the like), is that certain metals including iron (Fe) and aluminum (Al) have little to no solubility in the weak FSA solution. Thus, less Fe and Al impurities are present and require removal via precipitation, leading to a higher purity DCP product. For animal feed, it is desirable to produce a high purity DCP product with low levels of metals, such as Fe and Al impurities and other metal impurities, which are known to be toxic.

Magnesium oxide (MgO) may also be present in the product. Depending on the specific requirements of the commercial grade DCP, the presence of MgO may be tolerated. MgO may be present in the calcium phosphate source in step (a). To achieve acceptable levels of MgO in the DCP product produced in step (d), the choice of calcium phosphate source must be considered.

In some embodiments, in step (d) the DCP product produced has a low level of metal oxides. In some embodiments, in step (d) the DCP product produced contains about 1.0% to about 0.02%, or less of $Fe_2O_3$. In some embodiments, in step (d) the DCP product produced contains about 1.0%, about 0.5%, about 0.1%, about 0.02%, or less of $Fe_2O_3$. In certain embodiments, in step (d) the DCP product produced contains about 1.0% or less of $Fe_2O_3$. In certain embodiments, in step (d) the DCP product produced contains about 0.5% or less of $Fe_2O_3$. In certain embodiments, in step (d) the DCP product produced contains about 0.1% or less of $Fe_2O_3$. In certain embodiments, in step (d) the DCP product produced contains about 0.02% or less of $Fe_2O_3$.

In some embodiments, in step (d) the DCP product produced contains about 1.0% to about 0.05%, or less of $Al_2O_3$. In some embodiments, in step (d) the DCP product produced contains about 1.0%, about 0.5%, about 0.1%, about 0.05%, or less of $Al_2O_3$. In certain embodiments, in step (d) the DCP product produced contains about 1.0% or less of $Al_2O_3$. In certain embodiments, in step (d) the DCP product produced contains about 0.5% or less of $Al_2O_3$. In certain embodiments, in step (d) the DCP product produced contains about 0.1% or less of $Al_2O_3$. In certain embodiments, in step (d) the DCP product produced contains about 0.05% or less of $Al_2O_3$.

In some embodiments, in step (d) the DCP product produced contains about 1.0% to about 0.02% or less of $Fe_2O_3$ and about 1.0% to about 0.05% or less of $Al_2O_3$. In some embodiments, in step (d) the DCP product produced contains about 0.02% or less of $Fe_2O_3$ and about 0.05% or less of $Al_2O_3$. Additionally, any combination of the above listed percentages for each of $Fe_2O_3$ or $Al_2O_3$ may also be combined.

In some embodiments, in step (a) the calcium phosphate source is phosphate rock concentrate, run of mine ore, or a waste stream from a phosphate beneficiation plant. In some embodiments, in step (a) the calcium phosphate source is phosphate rock concentrate. In some embodiments, in step (a) the calcium phosphate source is run of mine ore. In some embodiments, in step (a) the calcium phosphate source is a waste stream from a phosphate beneficiation plant.

An advantage of the present invention is that multiple sources of calcium phosphate may be utilized, even those typically thought of as waste. For example, waste streams from phosphate beneficiation plants can be used as a calcium phosphate source in step (a). Use of waste streams represents an economic advantage because waste streams have little to no economic value and their disposal may even incur costs. As such, use of waste streams to produce a DCP product with low levels of impurities can be profitable. Further, utilizing waste streams conserves phosphorous by tapping a source that would otherwise be discarded.

Moreover, use of run of mine ore in the production of DCP cuts out need for processing in a beneficiation plant, which lowers costs and conserves phosphorous because no phosphorous is lost to waste streams produced in the process of beneficiation.

In some embodiments, the calcium source is calcium oxide, calcium hydroxide, or calcium carbonate. In certain embodiments, the calcium source is calcium oxide. In certain embodiments, the calcium source is calcium hydroxide. In certain embodiments, the calcium source is calcium carbonate.

In some embodiments, in step (c) the precipitation is performed at about pH 3-4 or about pH 3.2. In certain embodiments, in step (c) the precipitation is performed at about pH 3-4. In certain embodiments, in step (c) the precipitation is performed at about pH 3.2.

In some embodiments, in step (d) the precipitation is performed at about pH 4-7, about pH 5-5.5, about pH 5.5-7, about pH 6-7, or about pH 7. In certain embodiments, in step (d) the precipitation is performed at about pH 4-7. In certain embodiments, in step (d) the precipitation is performed at about pH 5-5.5. In certain embodiments, in step (d) the precipitation is performed at about pH 5.5-7. In certain embodiments, in step (d) the precipitation is performed at about pH 6-7. In certain embodiments, in step (d) the precipitation is performed at about pH 7.

It is advantageous that the present invention can produce a mixture of dihydrate di-calcium phosphate ($CaHPO_4 \cdot 2H_2O$) and anhydrous di-calcium phosphate ($CaHPO_4$), substantially dihydrate di-calcium phosphate ($CaHPO_4 \cdot 2H_2O$), or substantially anhydrous di-calcium phosphate ($CaHPO_4$). As the temperature at which the precipitation is performed in step (d) increases, the ratio of anhydrous di-calcium phosphate ($CaHPO_4$) to dihydrate di-calcium phosphate ($CaHPO_4 \cdot 2H_2O$) produced also increases. In some embodiments, in step (d) the precipitation is performed at a temperature between about 25-100° C. such that the desired DCP product, dihydrate di-calcium phosphate ($CaHPO_4 \cdot 2H_2O$) or anhydrous di-calcium phosphate ($CaHPO_4$) is produced.

The temperature in step (d) at which the precipitation is performed will also vary depending on the concentration of phosphate in the solution, wherein the temperature required decreases as the concentration of phosphate in the solution increases. In some embodiments in step (d) the precipitation is performed at a temperature between about 25-100° C., about 25-30° C., about 30-40° C., about 40-60° C., about 50-60° C., about 60-70° C., about 70-80° C., about 80-90° C., or about 90-100° C., such that the temperature decreases as the concentration of phosphate in the solution increases. In some embodiments, in step (d) the precipitation is performed at about 25-100° C. such that the temperature decreases as the concentration of phosphate in the solution increases. In some embodiments, in step (d) the precipitation is performed at about 60-100° C. such that the temperature decreases as the concentration of phosphate in the solution increases. In some embodiments, in step (d) the precipitation is performed at about 25-30° C. such that the temperature decreases as the concentration of phosphate in the solution increases. In some embodiments, in step (d) the precipitation is performed at about 30-40° C. such that the temperature decreases as the concentration of phosphate in the solution increases. In some embodiments, in step (d) the precipitation is performed at about 40-50° C. such that the temperature decreases as the concentration of phosphate in the solution increases. In some embodiments, in step (d) the precipitation is performed at about 50-60° C. such that the temperature decreases as the concentration of phosphate in the solution increases. In some embodiments, in step (d) the precipitation is performed at about 60-70° C. such that the temperature decreases as the concentration of phosphate in the solution increases. In some embodiments, in step (d) the precipitation is performed at about 70-80° C. or less such that the temperature decreases as the concentration of phosphate in the solution increases. In some embodiments, in step (d) the precipitation is performed at 80-90° C. such that the temperature decreases as the concentration of phosphate in the solution increases. In some embodiments, in step (d) the precipitation is performed at about 90-100° C. such that the temperature decreases as the concentration of phosphate in the solution increases. For example, based on 5% P2O5 in liquid in step (d) the precipitation could be performed at about 25° C. (ambient temperature), however the DCP product would be substantially the dihydrate form.

In some embodiments, the method comprises one or more additional precipitation steps. In some embodiments, the one or more additional precipitation steps occurs between steps (c) and (d). In some embodiments, the one or more additional precipitation steps removes heavy metal impurities. In some embodiments, the heavy metal impurities, when present, are selected from As, Cd, V, Cr, Hg, and Pb, or a combination thereof. In some embodiments, the one or more additional precipitation steps occurs at a pH suitable to remove specific heavy metal species present, which can be readily ascertained by a person of skill in the art. In certain embodiments, Cd is removed at a pH of about 4-4.5. In certain embodiments, As is removed at a pH of about 5.5-7.

In some embodiments, the method further comprises an additive. Employing an additive may be useful for removing certain heavy metal species present. For example, if a source of phosphate rock concentrate contains high amounts of cadmium (Cd) and/or arsenic (As), then an additive such as di-butyl-di-thiolphosphinate employed during a precipitation stage can aid in removal of Cd and/or As, resulting in a DCP product with higher purity. The amount of additive used is based on the amount of impurity present as is understood by a person of skill in the art (see, e.g., Example 1, Table 1).

In some embodiments, the additive has the following structure of formula (I):

wherein Q is a bond or O; $R_1$ and $R_2$ are independently H, or a linear or branched $C_{1-4}$ alkyl, wherein at least one of $R_1$ and $R_2$ is not H; and X is H, an alkali metal or ammonium.

When Q is a bond, the additive is a dithiophosphinate. When Q is O, the additive is a dithiophosphate. In some embodiments, $R_1$ and $R_2$ are independently a linear $C_{1-4}$ alkyl, such as methyl, ethyl, n-propyl or n-butyl. In other embodiments, $R_1$ and $R_2$ are independently a branched $C_{1-4}$ alkyl, such as isopropyl or isobutyl. In some embodiments, $R_1$ is H and $R_2$ is a linear $C_{1-4}$ alkyl, such as methyl, ethyl, n-propyl or n-butyl. In other embodiments, $R_1$ is H and $R_2$ is a branched $C_{1-4}$ alkyl, such as isopropyl or isobutyl.

In some embodiments, X is an alkali metal, such as lithium, sodium, or potassium. In other embodiments, X is ammonium.

In some embodiments, $R_1$ and $R_2$ are isobutyl and X is ammonium, sodium or potassium. For example, the additive may be ammonium di-isobutyl dithiophosphate, ammonium di-isobutyl dithiophosphinate, sodium di-isobutyl dithiophosphate, sodium di-isobutyl dithiophosphinate, potassium di-isobutyl dithiophosphate, or potassium di-isobutyl dithiophosphinate. In other embodiments, $R_1$ is H and $R_2$ is isobutyl. For example, the additive may be ammonium isobutyl dithiophosphate, ammonium isobutyl dithiophosphinate, sodium isobutyl dithiophosphate, sodium isobutyl dithiophosphinate, potassium isobutyl dithiophosphate, or potassium isobutyl dithiophosphinate.

In further embodiments, the additive used is an ammonium di-lower alkyl dithiophosphinate or dithiophosphate, such as ammonium di-isobutyl dithiophosphinate or ammonium di-isobutyl dithiophosphate. The ammonium salt of dithiophosphinate or dithiophosphate may remain in a dry solid form with no vapor pressure or odor and can dissolve easily in water. In contrast, the sodium salt of dithiophosphinate or dithiophosphate may form a high pH aqueous solution with strong odors and is normally sold at high concentrations (e.g., 50%). In some embodiments, it is advantageous for plant operators to handle the ammonium salts in solid form, as opposed to liquids. Further, the sodium salt of dithiophosphinate is a relatively expensive chemical, costing about four times that of the ammonium salt of dithiophosphate.

In some embodiments, the additive used has the following structure of formula (II):

wherein Q is a bond or O; $R_1$ is a linear or branched $C_{1-8}$ alkyl; and X is H, an alkali metal or ammonium. In some embodiments, $R_1$ is $C_{1-4}$ alkyl When Q is a bond, the additive is a dithioate. When Q is O, the additive is a xanthate. In some embodiments, $R_1$ is a linear $C_{1-4}$ alkyl, such as methyl, ethyl, n-propyl or n-butyl. In other embodiments, $R_1$ is a branched $C_{1-4}$ alkyl, such as isopropyl or isobutyl. In some embodiments, X is an alkali metal, such as lithium, sodium, or potassium. In other embodiments, X is ammonium.

In some embodiments, Q is O, $R_1$ is isobutyl and X is potassium or sodium. For example, the additive may be potassium isobutyl xanthate or sodium isobutyl xanthate. In some embodiments, the additive is sodium isobutyl xanthate. In some embodiments, Q is a bond, $R_1$ is isopropyl and X is potassium or sodium. For example, the additive may be sodium 2-methylpropanedithioate, or potassium 2-methylpropanedithioate.

In some embodiments, the method further comprises an additive selected from di-butyl-dithiophosphinate, di-butyl dithiophosphate, and butyl xanthate. In some embodiments, the additive is di-butyl dithiophosphate. In some embodiments, the additive is di-butyl dithiophosphinate. In some embodiments, the additive is butyl xanthate.

In some embodiments, step (a) undergoes a solid separation step prior to step (c). In some embodiments, step (c) undergoes a solid separation step prior to step (d). In some embodiments, the additional precipitation step, when present, undergoes a solid separation step. In certain embodiments, the solid separation step may be performed via plate and frame filter, flotation separation, active carbon separation, vacuum filtration, pressure filtration, gravity filtration, compression filtration, magnetic filtration and/or other liquid/solid separation techniques known in the art.

In some embodiments, step (a) undergoes a clarification step prior to step (c). In some embodiments, step (c) undergoes a clarification step prior to step (d). In some embodiments, the additional precipitation step, when present, undergoes a clarification step.

In some embodiments, step (c) undergoes a clarification step wherein the first cut solids are recycled into step (a). In some embodiments, step (d) undergoes a clarification step wherein the first cut solids are recycled into step (a). In some embodiments, an additional precipitation, when present, step undergoes a clarification step wherein the first cut solids are recycled into step (a).

In some embodiments, the precipitate produced in a given step is recycled for use in a previous step. In some embodiments, the precipitate produced in step (c) is recycled for use in another step of the method. In some embodiments, the precipitate produced in step (c) is recycled for use in step (a). In some embodiments, the precipitate produced in an additional precipitation step, when present, is recycled for use in step (a).

In some embodiments, the filter wash water produced in a given step is recycled for use in a previous step. In some embodiments, the filter wash water produced in step (c) is recycled for use in step (b). In some embodiments, the filter wash water produced in an additional precipitation step, when present, is recycled for use in step (b). In some embodiments, the filter wash water produced in step (d) is recycled for use in step (b).

In some embodiments, a method for producing a calcium phosphate salt is provided comprising: (a) digesting a first calcium phosphate source using an aqueous solution of fluorosilicic acid (FSA), to form a liquor consisting of an aqueous phase comprising phosphate ions in solution, and a first insoluble solid phase containing impurities; (b) separating the aqueous phase comprising phosphate ions in solution from the first insoluble solid phase containing impurities; (c) performing a first stage precipitation wherein said aqueous phase comprising phosphate ions in solution is neutralized with a calcium source at a pH sufficient to precipitate the excess fluoride in solution; and (d) performing a second stage precipitation wherein said aqueous phase comprising phosphate ions in solution is neutralized with a calcium source at a pH sufficient to isolate the product calcium phosphate salt.

Embodiments of the method described above may have characteristics of any of the previous embodiments described above, as applicable.

EXAMPLES

In order that this invention may be more fully understood, the following examples are set forth. These examples are for the purpose of illustrating embodiments of this invention, and are not to be construed as limiting the scope of the invention in any way. The reactants used in the examples below may be obtained either as described herein, or if not described herein, are themselves either commercially available or may be prepared from commercially available materials by methods known in the art.

Example 1

Production of Dihydrate Di-Calcium Phosphate from Rock Concentrate (Centrifugal Separation)

This study demonstrates that fractional precipitation can be used to produce a high quality animal feed product, di-calcium phosphate dihydrate (DCP) from the weak phosphoric acid liquor produced when fluorosilicic acid (FSA) is reacted with phosphate rock to produce an intermediate strength phosphoric acid and calcium fluoride (see, Equation 1).

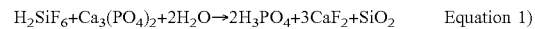
$$H_2SiF_6 + Ca_3(PO_4)_2 + 2H_2O \rightarrow 2H_3PO_4 + 3CaF_2 + SiO_2 \qquad \text{Equation 1)}$$

The neutralization step wherein the phosphoric acid produced is neutralized with a calcium oxide source is indicated in Equation 2.

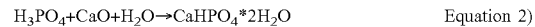
$$H_3PO_4 + CaO + H_2O \rightarrow CaHPO_4 \cdot 2H_2O \qquad \text{Equation 2)}$$

Approximately 10 small batches were reacted using dilute FSA and a rock concentrate ("rock A"). The $P_2O_5$ recoveries for the FSA reaction were 40% to 50%. However, the reactions produced high quality DCP at an estimated cost that matched the market value.

Rock A was not a preferred source of rock as the concentrate contained high amounts of cadmium (Cd) and arsenic (As). In order to obtain high quality DCP, fractional precipitations were required along with use of the additive di-butyl-di-thiol-phosphinate and a three stage precipitation.

The first stage precipitation was a CaO neutralization to about pH 3.2, which precipitated the excess fluoride in the weak acid solution. High quality animal feed grade DCP typically requires a P to F ratio of 100 to 1 or higher. The precipitation from the first stage neutralization was recycled to the FSA reaction and should be valued or discounted versus the rock concentrate cost based on an equivalent CaO to $P_2O_5$ ratio basis. Using the additive addition precipitates Cd and As in this phase.

The second stage precipitation was also a CaO neutralization and the precipitate produced was the product DCP. The weak acid solution was neutralized either to pH 4.5 or 7.0 depending on the amount of the arsenic (As) content in the solution after the first stage neutralization. Arsenic precipitates in the CaO neutralization in the 4.5 to 7.0 pH range. The precipitate from the third stage neutralization, if required, removes the residual $P_2O_5$ and As, this precipitate was also recycled back to the FSA reaction. The residual waste water after the neutralization can be recycled or discharged to fresh ground water systems as the fluoride and phosphate levels meet those requirements.

The initial experiments reacted 100 gram batches of rock and the reaction solids separations were performed using a small centrifuge. The separations were time consuming and the solids were re-pulped with water and re-centrifuged. The $P_2O_5$ recoveries were low. Alternative solids separation techniques may be employed and rock concentrates with lower cadmium and arsenic concentrations may be advantageous to reduce or eliminate the need for additives.

Tables 1 and 2 compares the overall reactions for Batch 8 and Batch 9 and demonstrates the difference between the addition of additive with the two stage precipitation and the three stage precipitation. Note that the three stage precipitation produced DCP with a high Cd content in the second stage. Without an additive addition, Cd will precipitate in the 4.0 to 4.5 pH range. The modified flowsheet is depicted in FIG. 1.

TABLE 1

Small Batch #8 - FSA to DCP Reaction

| | % P2O5 | % CaO | % Fe2O3 | % Al2O3 | % MgO | % F | As-ppm | Cd-ppm | % CO2 | Wt.grams |
|---|---|---|---|---|---|---|---|---|---|---|
| FSA Reaction | | | | | | | | | | |
| Rock | 29.59 | 48.90 | 0.22 | 0.38 | 0.66 | 3.81 | 16 | 21 | 8.02 | 140.0 |
| FSA-25% | | | | | | 19.7917 | | | | 150.0 |
| Water | | | | | | | | | | 763.7 |
| Weak.Acid | 3.61 | 0.69 | 0.0036 | 0.0028 | 0.0736 | 0.0328 | 2.7 | 2.1 | | 519.2 |
| Dry.Solids | 15.33 | 45.44 | 0.21 | 0.54 | 0.41 | 22.60 | 8.3 | 13.4 | | 115.2 |
| DCP Reaction | | | | | | | | | | |
| Weak.Acid | 3.61 | 0.69 | 0.0036 | 0.0028 | 0.0736 | 0.0328 | 2.7 | 2.1 | 48.0 | 510.97 |
| CaO | | 100 | | | | | | | | 17.54 |
| Additive | | | | | | | | | | 0.16 |
| Wash.H2O | | | | | | | | | | 100 |
| DCP-1 | 34.52 | 37.08 | 0.19 | 0.13 | 0.33 | 1.2100 | 9.2 | 21.4 | 12.5 | 6.01 |
| DCP-2 | 38.79 | 32.72 | 0.0318 | 0.0499 | 0.42 | 0.1630 | 8.9 | 1.9 | 103.9 | 41.17 |
| Waste.H2O | 0.12 | 0.0124 | 0.0003 | 0.0014 | 0.0421 | 0.0016 | 1.3 | 0.004 | 32.7 | 572.45 |

P2O5 Recovery for FSA Reaction = 45%

P2O5 Recovery for DCP Reaction as DCP = 87%

Combined Overall P2O5 Recovery = 39%

TABLE 2

Small Batch #9 - FSA to DCP Reaction

| | % P2O5 | % CaO | % Fe2O3 | % Al2O3 | % MgO | % F | As-ppm | Cd-ppm | % CO2 | Wt.grams |
|---|---|---|---|---|---|---|---|---|---|---|
| FSA Reaction | | | | | | | | | | |
| Rock | 29.59 | 48.90 | 0.22 | 0.38 | 0.66 | 3.81 | 16 | 21 | 8.02 | 140.0 |
| FSA-25% | | | | | | 19.7917 | | | | 150.0 |
| Water | | | | | | | | | | 814.5 |
| Weak.Acid | 3.21 | 0.64 | 0.0041 | 0.0031 | 0.0599 | 0.0132 | 2.6 | 1.8 | | 536.1 |
| Dry.Solids | | | | | | | | | | 124.86 |
| DCP Reaction | | | | | | | | | | |
| Weak.Acid | 3.21 | 0.64 | 0.0041 | 0.0031 | 0.0599 | 0.0132 | 2.6 | 1.8 | 106.1 | 524.09 |
| CaO | | 100 | | | | | | | | 16.36 |
| Additive | | | | | | | | | | 0 |
| Wash.H2O | | | | | | | | | | 100 |
| DCP-1 | 26.74 | 40.03 | 0.42 | 0.19 | 0.26 | 0.712 | 11 | 13.5 | 16.3901 | 3.8 |
| DCP-2 | 39 | 30.06 | 0.0173 | 0.0479 | 0.19 | 0.1550 | 6 | 21.1 | 109.8 | 38.65 |
| DCP-3 | 15.64 | 50.22 | 0.0286 | 0.0735 | 4.21 | 0.2250 | 90.2 | 3.7 | 30.3 | 1.63 |
| Waste.H2O | 0.0826 | 0.0248 | | 0.0013 | 0.0442 | 0.00118 | 1.6 | 0 | 30.5 | 555 |

P2O5 Recovery for FSA Reaction 42%

P2O5 Recovery for DCP Reaction as DCP = 90%

Combined Overall P2O5 Recovery = 37%

The overall economics for Batch 8 and Batch 9 are compared in Tables 3 and 4.

TABLE 3

Economics for Small Batch #8

|  | unit.cost | adj.wt | per ton | USD/t DCP | CaO/P2O5 |
|---|---|---|---|---|---|
| Rock | 100 | 140 | 3.347 | 334.65 | 1.65 |
| CaO | 210 | 17.82 | 0.426 | 89.47 |  |
| Additive | 3500 | 0.16 | 0.004 | 13.60 |  |
| off-spec | 154 | 6.11 | 0.146 | 22.46 | 1.07 |
| DCP | 400 | 41.83 | 1.000 | 400.00 |  |
| net USD |  |  |  | 437.72 |  |
| net USD With Discount for Off-spec DCP = |  |  |  | 415.26 |  |

TABLE 4

Economics for Small Batch #9

|  | unit.cost | adj.wt | per ton | USD/t DCP | CaO/P2O5 |
|---|---|---|---|---|---|
| Rock | 100 | 140 | 3.541 | 354.12 | 1.65 |
| CaO | 210 | 16.73 | 0.423 | 88.89 |  |
| Additive | 3500 | 0.00 | 0.000 | 0.00 |  |
| off-spec | 90 | 5.55 | 0.140 | 12.61 | 1.84 |
| DCP | 400 | 39.53 | 1.000 | 400.00 |  |
| net USD |  |  |  | 443.01 |  |
| net USD With Discount for Off-spec DCP = |  |  |  | 430.40 |  |

Example 2

Dihydrate Di-Calcium Phosphate from Rock Concentrate (Pressure Filtration Separation)

Additional studies were performed to refine the fractional precipitation technique. The test work incorporated multiple reaction batches with solids and liquid recycling along with pressure filtration and decantation techniques for solids separation. The rock concentrate ("Rock B") used for the experiments did not require three stage neutralization as Rock B contained lower levels of cadmium and arsenic. The first set of the multiple batch tests produced dihydrate di-Calcium phosphate (DCP) as shown in Equation 2 above (see, Example 1).

The first set of FSA reactions were formulated with 250 grams of Rock B that contained 31.39% $P_2O_5$, 49.27% CaO and 3.9% F. The 25% FSA addition of 335 grams was determined from a 1.2 Ca/F ratio and was later reduced to about 290 grams to adjust for material recycling. Although the reactions were formulated with dry rock and 25% FSA, additional water was added to the reaction mixture to simulate 70% solids rock slurry and 5% FSA solutions. The liquid portions of the mixtures were heated to 80° C. and after reaching temperature, the dry rock was added in increments to minimize foaming. After the rock additions were complete, the mixtures were allowed to react for 30 minutes at 80° C.

The reaction slurries were filtered by pressure filtration and washed with 500 grams of recycle water from the second stage precipitation. After sampling, the filtrate and the recovered wash water were processed in the first stage neutralization. The reaction slurries produced about 200 grams of waste solids (dry basis) with a moisture content of about 30%.

The first stage precipitation, a CaO neutralization to about pH 3.2, precipitated the excess fluoride in the weak acid solution. The solids were separated by decantation and, after sampling, recycled as slurry to the FSA reactor.

The second stage precipitation, a CaO neutralization to about pH 7.0, precipitated the product DCP. A portion (500 grams) of the residual waste water after the neutralization was used as wash water for the FSA reaction solids. The amount of residual wash water recovered varied but averaged about 1000 grams. The excess water produced could be recycled in the phosphoric acid facility or discharged to fresh ground water systems as the fluoride and phosphate levels meet those requirements.

Overall the seven batches consumed 1750 grams of rock and produced 726 grams of product DCP at an estimated cost of about 290 USD/ton of DCP. 0.73 tons of 100% FSA were neutralized per ton of DCP produced (see, Table 5). $P_2O_5$ recoveries averaged 61%.

TABLE 5

Costs for DCP Dihydrate

|  | unit.cost USD/t | amount | Totals |
|---|---|---|---|
| Rock | 100 | 1750 | 175000.00 |
| CaO | 210 | 286.5 | 60165.00 |
| off-spec | 151.92 | 164.8 | −25036.42 |
| DCP - cost | 289.43 | 726 | 210128.58 |

Example 3

Anhydride Di-Calcium Phosphate from Rock Concentrate

Pressure Filtration Separation

Further studies were performed after an attempt to produce anhydrous DCP from the dihydrate form by oven drying failed. The temperature for the second stage precipitation was elevated to 70° C. to produce the anhydride during neutralization and the batch sizes were increased.

Figure 2:
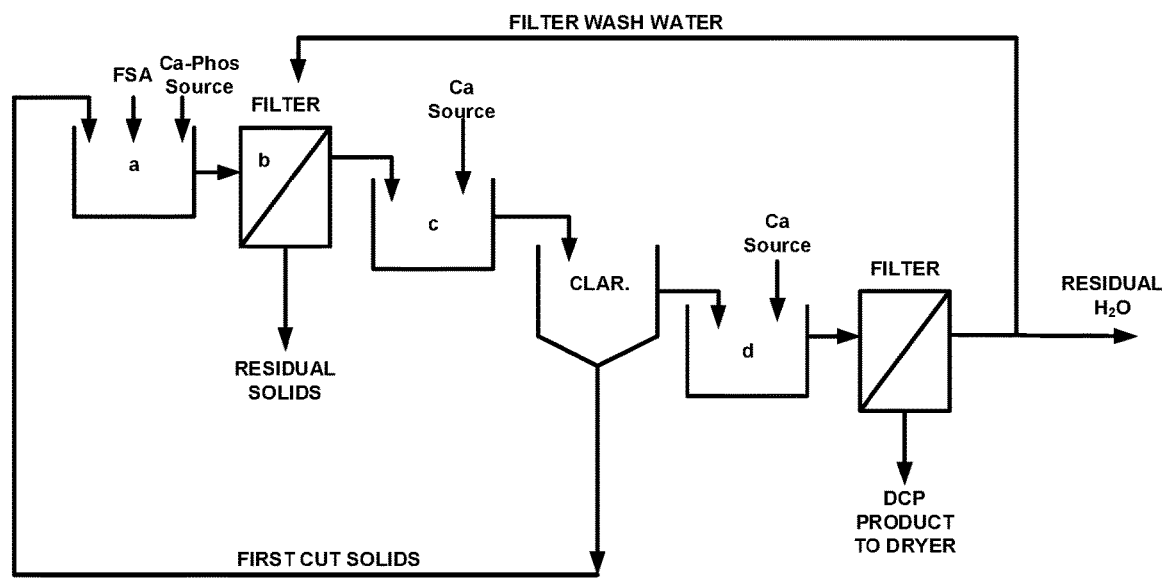
FIG. 2 depicts an exemplary embodiment of the invention wherein, the workflow comprises: (a) reacting FSA with a calcium phosphate source; (b) a solid filtration step to remove residual solids; (c) a first stage precipitation with a calcium source followed by a clarification step wherein the first cut solids are recycled into step (a); and (d) a final stage precipitation with a calcium source followed by a solid filtration step wherein the filter wash water is recycled in to step (b). In a specific exemplary embodiment of the invention as disclosed in FIG. 2, the workflow comprises: (a) reacting FSA with a calcium phosphate source; (b) a solid filtration step to remove residual solids, which are then discarded as waste; (c) a first stage precipitation with a calcium source preformed at about pH 3.2 followed by a clarification step wherein the first cut solids are recycled into step (a); and (d) a final stage precipitation with a calcium source preformed at about pH 7.0 and at about 70° C. followed by a solid filtration step wherein the filter wash water is recycled in to step (b).

Overall the seven additional batches consumed 3925 grams of rock concentrate ("Rock B"), 1051 grams of CaO and produced 1595 grams of DCP anhydride at an average cost of 365 USD/ton. The FSA reaction batches were formulated for a 1.25 Ca to F ratio. In sum, FSA 0.79 tons (100% basis) were neutralized per ton of DCP produced and the overall $P_2O_5$ recovery averaged 56%. The modified flowsheet is depicted in FIG. 2.

The product DCP had a 248:1 P to F ratio, however the final product may not meet the specifications for some commercial grades of DCP. Further analysis of the individual batches indicated all were over formulated with CaO and were low for anhydride content. In fact several batches contained free water instead of anhydrite. The details are listed in Table 6. However, the values specified below may be acceptable for certain commercial grades of DCP.

TABLE 6

| DCP-Anhydride | % P | % Ca | PtoF | Ca(HPO4) * 2H2O | Ca(HPO4) | CaO | % H2O |
|---|---|---|---|---|---|---|---|
| Composite of 20-26 | 16.87% | 27.74% | 248 | 84.2% | 7.5% | 8.4% |  |
| Batch #20 | 17.96% | 29.75% | 265 | 57.3% | 33.5% | 9.2% |  |
| Batch #21 | 18.14% | 28.66% | 265 | 62.4% | 30.2% | 7.4% |  |
| Batch #22 | 16.36% | 30.34% | 260 | 73.1% | 14.0% | 12.9% |  |

TABLE 6-continued

| DCP-Anhydride | % P | % Ca | PtoF | Ca(HPO4) * 2H2O | Ca(HPO4) | CaO | % H2O |
|---|---|---|---|---|---|---|---|
| Batch #23 | 15.29% | 28.89% | 218 | 84.8% | 0.0% | 12.8% | 2.3% |
| Batch #24 | 15.85% | 26.59% | 226 | 87.9% | 0.0% | 8.6% | 3.5% |
| Batch #25 | 15.06% | 21.64% | 188 | 83.6% | 0.0% | 3.1% | 13.4% |
| Batch #26 | 17.44% | 29.33% | 291 | 66.6% | 23.9% | 9.6% | |
| Commercial Grade | 19.00% | 28.00% | >100 | 46.7% | 46.5% | 4.9% | 2.0% |

Example 4

Anhydrous Di-Calcium Phosphate from Run of Mine Ore

In an effort to reduce the final product costs, run of mine ore was used as the rock feed versus rock concentrate. Run of mine ore is the feed to the mine beneficiation plant and is available at lower costs (25 USD/ton) than the mine product concentrate (100 USD/ton).

Two batches were processed without recycling and although the average $P_2O_5$ recoveries were low at about 35%, the DCP product cost were much lower cost at about 215 USD/ton as indicated in Table 7. Both batches were over-formulated with CaO and contained free water rather than anhydride. The impurity content of the final product, is shown in Table 8. Although the As and Cd concentrations could be reduced as demonstrated earlier, the high MgO content may only be acceptable for certain uses. However, the values specified below may be acceptable for certain commercial grades of DCP.

TABLE 7

Costs for Run of Mine DCP

| | units | USD/t | | USD |
|---|---|---|---|---|
| Rock | 500 | 25 | | 12500 |
| CaO | 57.62 | 210 | | 12100.2 |
| Recycle | 16.75 | 83.66 | at 100/t | -1401.26 |
| | Ca/P2O5 | 1.877 | for1.57 | |
| Product | 107.44 | 215.92 | | 23198.94 |

TABLE 8

Analyses for Run of Mine DCP

| Sample | % $P_2O_5$ | % CaO | % F | P to F | As - ppm | Cd - ppm | % $Fe_2O_3$ | % $Al_2O_3$ | % MgO |
|---|---|---|---|---|---|---|---|---|---|
| Rock Feed | 22.40 | 42.51 | 2.74 | 8 | 6.9 | 20.6 | 0.32 | 0.70 | 2.93 |
| Batch 1 | 15.80 | 26.23 | 0.06 | 251 | 33.9 | 34.9 | 0.0084 | 0.0362 | 3.88 |
| Batch 2 | 15.45 | 27.78 | 0.10 | 155 | 29.8 | 45.2 | 0.0183 | 0.0529 | 3.50 |

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for producing di-calcium phosphate (DCP) comprising:
   (a) reacting fluorosilicic acid (FSA) with water and a calcium phosphate source to produce phosphoric acid, calcium fluoride, and silicon dioxide;
   (b) removing residual solids;
   (c) performing a first stage precipitation wherein the phosphoric acid generated in step (a) is reacted with a calcium source and water to remove residual fluoride; and
   (d) performing a second stage precipitation wherein the phosphoric acid from step (c) is reacted with a calcium source and water to produce the product DCP.

2. The method of claim 1, wherein step (a) the reaction is performed at about 70-100° C. and is sustained for about 20-60 minutes.

3. The method of claim 1, wherein the ratio of Ca:F in step (a) ranges from about 1.4:1 to about 1:1.

4. The method of claim 1, wherein in step (d) the DCP product produced is substantially dihydrate di-calcium phosphate ($CaHPO_4*2H_2O$).

5. The method of claim 1, wherein in step (d) the DCP product produced is substantially anhydrous di-calcium phosphate ($CaHPO_4$).

6. The method of claim 1, wherein in step (d) the DCP product produced is a mixture of dihydrate di-calcium phosphate ($CaHPO_4*2H_2O$) and anhydrous di-calcium phosphate ($CaHPO_4$).

7. The method of claim 1, wherein in step (d) the DCP product produced contains about 20 ppm or less of As.

8. The method of claim 1, wherein in step (d) the DCP product produced contains about 50 ppm or less of Cd.

9. The method of claim 1, wherein in step (d) the DCP product produced contains a ratio of P:F of about 100:1 to about 300:1.

10. The method of claim 1, wherein in step (d) the DCP product produced contains about 0.2% or less of fluorides.

11. The method of claim 1, wherein in step (d) the DCP product produced contains a ratio of Ca:P of about 1.5:1 to about 1:1.

12. The method of claim 1, wherein in step (d) the DCP product produced contains about 1.0% or less of $Fe_2O_3$ and about 1.0% or less of $Al_2O_3$.

13. The method of claim 1, wherein in step (a) the calcium phosphate source is phosphate rock concentrate, run of mine ore, or a waste stream from a phosphate beneficiation plant.

14. The method of claim 1, wherein the calcium source is calcium oxide, calcium hydroxide, or calcium carbonate.

15. The method of claim 1, wherein in step (c) the precipitation is performed at about pH 3-4.

16. The method of claim 1, wherein in step (d) the precipitation is performed at about pH 4-7.

17. The method of claim 1, wherein in step (d) the precipitation is performed at a temperature between about 25-100° C.

18. The method of claim 1, comprising one or more additional precipitation steps.

19. The method of claim 1, further comprising an additive selected from di-butyl-dithiophosphinate, di-butyl dithiophosphate, or butyl xanthate.

20. A method for producing a calcium phosphate salt comprising:
   (a) digesting a first calcium phosphate source using an aqueous solution of fluorosilicic acid (FSA), to form a liquor consisting of an aqueous phase comprising phosphate ions in solution, and a first insoluble solid phase containing impurities;
   (b) separating the aqueous phase comprising phosphate ions in solution from the first insoluble solid phase containing impurities;
   (c) performing a first stage precipitation wherein said aqueous phase comprising phosphate ions in solution is neutralized with a calcium source at a pH sufficient to precipitate any excess fluoride in solution; and
   (d) performing a second stage precipitation wherein said aqueous phase comprising phosphate ions in solution is neutralized with a calcium source at a pH sufficient to produce the product calcium phosphate salt.

* * * * *